2,924,625

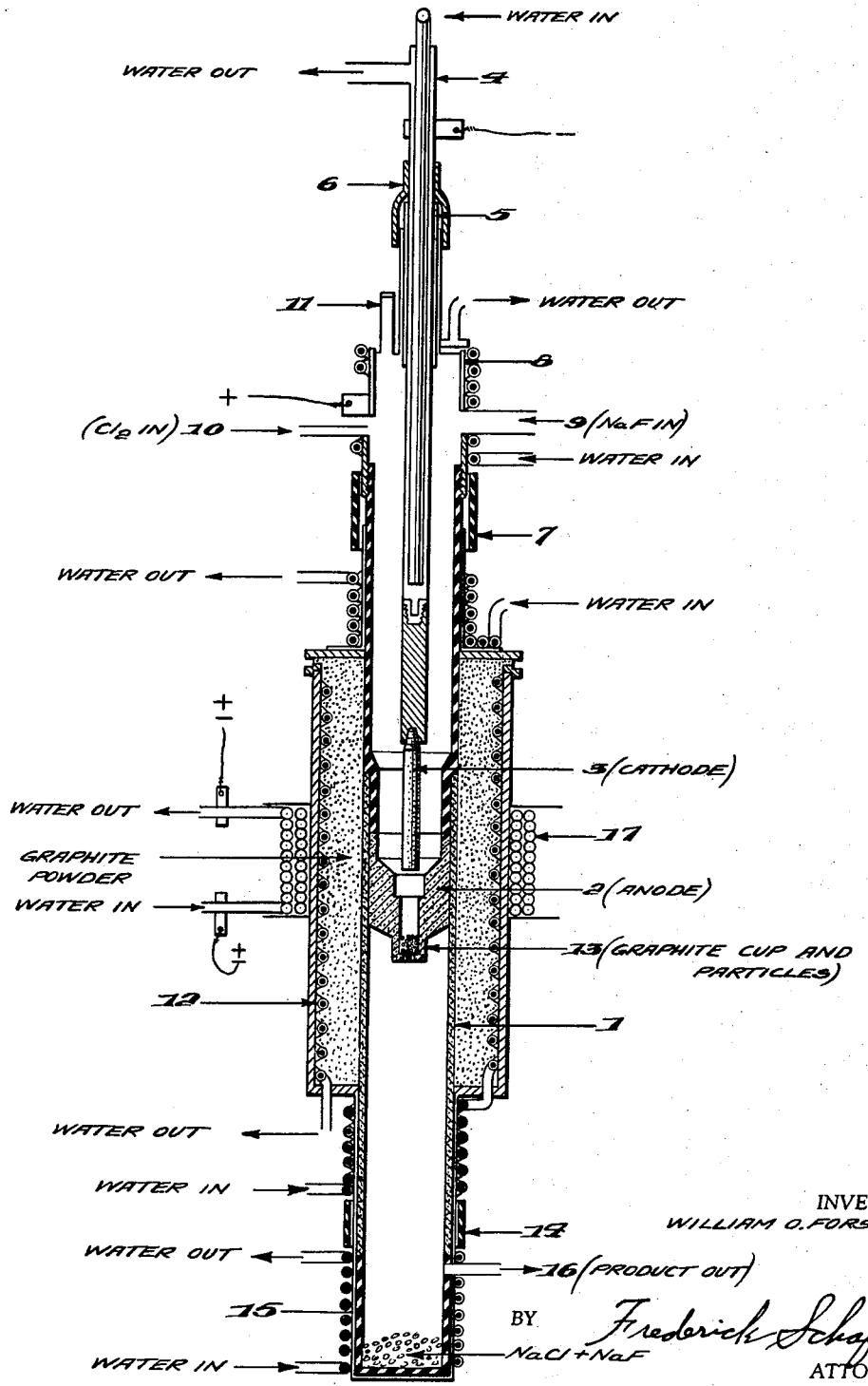

PROCESS FOR PREPARING CARBON TETRAFLUORIDE OF HIGH DEGREE OF PURITY FROM REACTANTS HEATED IN CARBON ELECTRIC ARC

William O. Forshey, Jr., New Castle, Del., assignor to E. I. du Pont de Nemours and Company, Wilmington, Del., a corporation of Delaware Application November 21, 1957, Serial No. 697,989

9 Claims. (Cl. 260—653)

This invention relates to a process for preparing carbon tetrafluoride in essentially pure form. More particularly this invention relates to an improved process for preparing carbon tetrafluoride of a high degree of purity from reactants heated in a carbon electric arc.

Carbon tetrafluoride is an important industrial chemical which finds uses as refrigerant liquid, dielectric fluid and ingredient of aerosol compositions, e.g., insecticidal compositions. It is also the starting material in a new process, described in U.S. Patent 2,709,192, for synthesizing the technically important tetrafluoroethylene.

Very few methods are available for preparing carbon tetrafluoride from inexpensive starting materials. A new synthesis of chlorofluorocarbons from carbon, chlorine and certain fluorides, e.g., hydrogen fluoride and alkali metal fluorides, has been recently described in U.S. Patent 2,709,184. This process gives carbon tetrafluoride, but only in low conversions and as a by-product mixed with larger amounts of chlorofluorocarbons. One of the embodiments shown in this patent is the use of a carbon arc as a source of heat for the reaction, as well as a source of carbon from the electrodes of the arc. However, it is clear from the disclosures of the patent that the use of a carbon arc leads to a product consisting essentially of chlorofluorocarbons and containing less than 1% of carbon tetrafluoride on a molar basis.

It was therefore not to be expected from the teachings of this Patent 2,709,184 that a selection of certain reactants shown therein with critical changes in the disclosed reaction conditions would change the course of the reaction and lead to a result radically different from that disclosed. This, however, has now been accomplished through the present invention whereby a halocarbon product containing at least 90% of carbon tetrafluoride, i.e., nearly pure carbon tetrafluoride, is obtained in excellent conversions from inexpensive reactants which are passed through a carbon electric arc.

It is furthermore known, as disclosed in U.S. Patent 2,757,212, that when carbon tetrafluoride is brought in contact with chlorine and carbon at a very high temperature, e.g., in a carbon arc, much of the carbon tetrafluoride is converted to chlorofluorocarbons. Thus, it is all the more surprising that, under the conditions of the present invention, carbon tetrafluoride is nearly the sole reaction product from a reaction in which it is formed in contact with chlorine and carbon at a very high temperature.

It is an object of this invention to provide a process for preparing carbon tetrafluoride in essentially pure form. A further object is to provide an improved process for preparing carbon tetrafluoride of a high degree of purity from reactants heated in a carbon electric arc. A still further object is to provide an improved process for preparing carbon tetrafluoride in excellent conversions from inexpensive reactants. Other objects will appear hereinafter.

These and other objects of this invention are accomplished by the following process for preparing carbon tetrafluoride which comprises heating and vaporizing in a carbon electric arc a fluoride of an alkali metal of atomic number 11 to 19 in admixture with chlorine, the molar ratio of chlorine to the alkali metal fluoride in said admixture being from 0.3:1 to 0.5:1, and contacting the effluent products of the carbon arc while in the vaporized phase with a mass of carbon particles which is at a temperature above the boiling point of the alkali metal fluoride and is in amount of at least 0.25 g./atom per mole of the alkali metal fluoride. There is thus obtained a halocarbon product containing at least 90% of carbon tetrafluoride on a molar basis, provided the effluent gas from the arc zone is brought before it has cooled to below the boiling point of the alkali metal fluoride, and preferably within less than 0.2 second, in contact with carbon at a temperature above the boiling point of the alkali metal fluoride.

Since carbon tetrafluoride constitutes very nearly all of the fluorocarbon reaction product, the process can be essentially represented by the equation

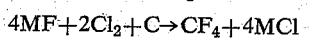

$$4MF + 2Cl_2 + C \rightarrow CF_4 + 4MCl$$

wherein M stands for an alkali metal of atomic number 11 to 19, i.e., sodium or potassium. When operating under the stated critical conditions, the organic, alkali-insoluble, fluorine-containing reaction product contains at least 90% of carbon tetrafluoride on a molar basis, generally over 95%, and under optimum conditions, it is substantially entirely carbon tetrafluoride. Although some chlorotrifluoromethane, occasionally with trace amounts of the other chlorofluoromethanes, may be formed along with the desired product carbon tetrafluoride, these are only in very small amounts, not exceeding at the most 10%. This small proportion of chlorotrifluoromethane does not interfere with the principal uses of carbon tetrafluoride mentioned above. Thus, the reaction product of the present invention consists essentially or almost entirely of carbon tetrafluoride.

Sometimes, the reaction product contains small amounts of inorganic by-products (e.g., silicon tetrafluoride, hydrogen chloride and carbon dioxide), these being formed from moisture and impurities which are difficult to remove from the reactants. These by-products, which are present in only minor proportions, can readily be separated from the carbon tetrafluoride by washing the reaction product with water or aqueous alkali. This treatment also removes the unreacted chlorine, if any, although, if desired, such unreacted chlorine can be easily separated by a simple distillation from the carbon tetrafluoride and recovered.

What happens when the chlorine and the alkali metal fluoride come in contact with the carbon arc is not known with certainty. However, experimental evidence shows that carbon tetrafluoride is not formed in important amounts at this point, in spite of the fact that carbon (from the electrodes) is present together with the other two reactants and that this zone of contact is at a very high temperature (the temperature of a carbon arc is estimated to be in the range of 3000 to 4000° C., and possibly higher). In order to obtain a product consisting nearly essentially of carbon tetrafluoride, another step is necessary. This is the step wherein the effluent gas mixture from the arc zone (vaporized alkali metal fluoride, chlorine and whatever chemical entities or fragments, i.e., radicals, may have been formed in the arc) is brought while still in the vapor phase into intimate contact with hot carbon at a critical temperature.

For successful results, the carbon brought into contact with the gas mixture emerging from the arc zone should be at a temperature above the boiling point of the alkali metal fluoride. At atmospheric pressure, this is about 1700° C. for sodium fluoride and about 1500° C. for potassium fluoride, although these values can be altered somewhat by operating either at subatmospheric or superatmospheric pressures. The corresponding alkali metal chlorides, which form during the reaction, have about the same, or somewhat lower boiling points.

In general, a satisfactory temperature for the reactant carbon is in the range of 1800 to 2500° C. In practice, this temperature is conveniently achieved without additional heat input by placing a bed of carbon or graphite in the path of the effluent gas mixture immediately following the arc zone, e.g., at a distance of between 0.5 and 10 cm. from the arc zone as shown by the drawing and description hereinafter of a suitable apparatus. With such an arrangement, the reactant carbon is maintained at the desired temperature by the heat generated by the arc.

It is necessary that the reactant mixture vaporized in the carbon arc come in contact with additional hot carbon while the reactant mixture is still gaseous, that is, before the gases have cooled down to below the boiling point of the alkali metal fluoride. The time interval during which the effluent gases remain at the desired temperature will, of course, vary somewhat with the design of the apparatus, and it may be extended by making suitable provisions for additional heat input, if desired. However, it is naturally preferable to use the arc as the sole source of heat, and in such a case the time interval between the passage of the reactants through the arc zone and their coming in contact with the hot carbon should preferably not exceed 0.2 second. With an apparatus of the general type illustrated in the drawing, it is normally less than 0.1 second.

Any form of carbon, whether amorphous or crystalline, is suitable. Thus, there can be used anthracite, graphite, charcoal or the various forms of carbon black. Smaller amounts of by-products are obtained when the carbon is as free as possible from hydrocarbon impurities and silicon. However, the carbon need not be rigorously pure. At least some of the carbon entering into the reaction is furnished by the electrodes of the carbon arc, which are usually made of amorphous carbon or graphite. The material of which these electrodes are made need not be especially purified. It is only necessary that its electrical conductivity be sufficiently high.

The reactant carbon, beyond the variable and indeterminate amount supplied by the electrodes, should be used in at least the theoretically required amount, i.e., at least 0.25 g./atom per mole of alkali metal fluoride. Beyond that, the quantity of carbon present is not critical. It is normally used in excess, e.g., in amounts between 0.5 and 5 g./atom per mole of alkali metal fluoride. The reactant carbon can be used either in finely divided form or as coarser particles, e.g., of 1 to 20 mm. in diameter.

Either sodium fluoride or potassium fluoride can be used with equally good results. Commercial grades of sodium and potassium fluoride can be used without purification. It is only necessary that they be substantially anhydrous since the presence of water vapor in the system lowers the conversions. Similarly, any good industrial grade of chlorine can be used.

In order to achieve maximum utilization of both the chlorine and the alkali metal fluoride, it is necessary to employ these reactants in the specified range of proportions, that is, in amounts such that the molar ratio of the chlorine to the alkali metal fluoride as they come in contact with the reactant carbon is between 0.3:1 and 0.5:1, and preferably between 0.4:1 and 0.5:1. By observance of this ratio, conversions of chlorine to halocarbons are at least 80% and often at least 90%, and they can even be quantitative under optimum conditions.

Since the arc zone normally occupies a very small space, and since the zone of contact between the effluent gas and the reactant carbon, while larger, is also normally small, it is difficult to state accurately what the contact time between the three reactants at reaction temperature should be. The contact time depends, of course, on the design of the apparatus and on the absolute pressure within the system. It is known, however, that at the very high temperatures employed, a very short contact time is sufficient. It can be said in general that, at the operating pressure, the contact time between the reactants at reaction temperature can be as short as 0.01 second and need not exceed about 2 seconds.

In order that this synthesis of carbon tetrafluoride be industrially practical, it is desirable that conversion of the alkali metal fluoride be carried out to the point where it becomes unnecessary for economical operation to recover the unchanged sodium or potassium fluoride. In practice, this means that at least 60%, desirably at least 80%, of the alkali metal fluoride should be converted to alkali metal chloride. This is achieved first by using the chlorine and the alkali metal fluoride in the already stated proportions and, second, by suitably adjusting the flow rate, i.e., the contact time, of the reactants. Thus, using the reactants in the prescribed ratio, contact should be maintained at reaction temperature until at least 60%, and preferably at least 80% of the alkali metal fluoride has been converted to alkali metal chloride, or, otherwise expressed, until the molar ratio of alkali metal chloride to alkali metal fluoride in the reaction mixture is at least 3:2 and preferably at least 4:1. However, it is not generally desirable to operate under conditions such that this ratio exceeds about 8:1 since this would in general result in less efficient conversions of the chlorine. The end point can be readily determined by titration of either the chloride or fluoride ion in a sample of the solid reaction products.

The process can be carried out at atmospheric pressure or even at superatmospheric pressures, if desired. However, a carbon arc operates in general more efficiently at subatmospheric pressure. For this reason, it is preferred to maintain the system at reduced pressures, for example, within the range of 10 to 300 mm. of mercury absolute pressure. With suitable arrangements to remove and collect the reaction products, both solid and gaseous, the process can be carried out in a continuous manner.

The form of the carbon arc to be used in this process is not critical, so long as the apparatus is so constructed that the gas mixture emerging from the arc zone comes in intimate contact with hot carbon before it has had time to cool down to below the boiling point of the alkali metal fluoride. Thus, for example, carbon arcs of the types illustrated in U.S. Patent 2,709,192 can be used after suitable modification to provide for the intimate contact of the off-gas with hot carbon, e.g., insertion of a carbon bed close to the arc in the hollow electrode which serves as outlet for the gases, and provisions to collect the alkali metal chloride and unchanged alkali metal fluoride after they have condensed and solidified.

An especially preferred type of electric arc for use in this process is a magnetically rotated arc. In comparison with static arcs of conventional design or even with the improved arcs of the kind mentioned above, a rotating arc is far more efficient by virtue of its much greater stability and of the far better contact between arc and reactants that it permits.

The example which follows was carried out using a rotating carbon electric arc as illustrated in the drawing. The drawing shows a vertical section, more or less diagrammatical, of a form of rotating carbon electric arc reactor suitable for use in this invention. Briefly described, the reactor comprises essentially a 2⅝" vertical graphite tube 1 into which is threaded an anode 2 consisting of a graphite insert with a 1" hole around the vertical center line. The graphite tube with its insert constitutes one of the electrodes (anode). The other electrode (cathode) is a solid ½" graphite rod 3 mounted on a cathode holder 4 which is a water-cooled copper pipe electrically insulated from the tube reactor by a polytetrafluoroethylene bushing 5, and held thereon through a vacuum tight rubber seal 6. The lower end of the cathode 3 is concentric with the anode insert 2 and essentially flush with the upper part of it, so that the arc flame is located in the annular space between anode and cathode. The graphite tube 1 is connected through a vacuum tight rubber seal 7 to a water-cooled copper head 8 through the center of which passes the bushing 5 surrounding the cathode holder 4.

The head 8 is provided with an inlet tube 9 through which the solid alkali metal fluoride, and if desired finely divided carbon, is introduced at a predetermined rate by means of a worm injector (not shown). The head 8 is also provided with a gas inlet tube 10 through which chlorine is introduced through a flowmeter (not shown), if desired with an inert gas diluent and carrier such as nitrogen or helium. A sight tube 11 is also provided at the top of the head 8, to permit visual inspection of the arc.

The anode insert 2 is fitted at its lower end with a perforated graphite cup 13 containing a bed of graphite granules of 4–8 mesh particle size. All gases emerging from the arc zone must pass through this cup and the graphite bed in it. This bed can be replenished by feeding finely divided carbon with the other reactants through the arc.

The graphite reactor tube 1 is enclosed in a water-cooled copper jacket 12 containing, for purposes of heat insulation, approximately 1½" of graphite powder. The lower section of the reactor tube 1 below the copper jacket 12 is cooled by means of water circulating in a coil wrapped around the graphite tube, and the reaction products non-volatile at this lower temperature (alkali metal fluoride and alkali metal chloride) condense as solids in this portion of the tube. To the lower end of reactor tube 1 is attached, through a vacuum-tight rubber seal 14, a water-cooled graphite liner 15 at the bottom of which the said solid reaction products collect. The liner 15 is provided with an outlet tube 16 through which the gaseous reaction products (halocarbons, unreacted chlorine, if any, etc.) leave the reactor and are led to a collection system (not shown) of cold traps where the gases condense. Reduced pressure can be applied to the entire assembly through the gas collection system by means of a vacuum pump (not shown).

The arc is rotated by means of an electromagnetic field. This field is generated by a D.C. current through the rotator coil 17, supported on a copper frame outside the copper jacket 12 around the arc portion of the reactor. The coil is constructed of 51 turns of 3/16" copper tubing, electrically insulated by fiberglass sleeve insulation, and it is internally water-cooled during operation to prevent overheating due to the high currents used (50–200 amperes).

Briefly, the rotating arc operates as follows: The reactants (chlorine and the alkali metal fluoride, if desired mixed with carbon) pass through the symmetrical annular gap formed by the substantially cylindrical solid cathode and the substantially cylindrical hollow anode, wherein a continuous electrical discharge is rotated by magnetic lines of flux essentially parallel to the axis of rotation of the annular arc gap. This causes the arc to move at right angles to the magnetic field lines. The magnetic field is created by a current, preferably a direct current, which passes through the coil surrounding the arc. A suitable field strength to cause rotation is 100–200 gauss. The arc rotates extremely rapidly in the annular gap between the electrodes, its speed being estimated at 1000 to 10,000 revolutions per second, and it heats the reactants very uniformly to extremely high temperatures as they pass through the gap.

The electrical characteristics of the rotating arc are essentially similar to those of a linear arc. Thus, operating conditions of the arc may be varied over a wide range from the minimum voltage required to maintain the arc to very high voltages, e.g., in the range of 10 to 75 volts. In general, for a given current the required voltage of the arc is determined by the pressure in the system, the width of the arc gap, and the nature of the gases present in the arc chamber. The power requirements will, of course, depend on the quantity of reactants passed through the rotating arc and the temperature to which they are to be heated.

The arc may be operated with a direct current or an alternating current, if the alternating current is of high frequency and is employed in combination with an alternating magnetic field which is in phase with the arc current. A direct current is greatly preferred, since only with a direct current is it possible to obtain a truly continuous rotating arc resulting in uniform heating and high stability. Current intensities in the range of 50–500 amperes are generally used.

In operating this equipment, the entire reaction system is evacuated to less than 0.2 mm. of mercury through the gas collection system with the inlet tubes closed. An inert gas, e.g., nitrogen, is then bled into the system through the inlet to the reactor head to a pressure of approximately 10–15 mm. of mercury. The power unit is then activated to supply the rotating field current; the arc is established between the electrodes and the arc current adjusted to the correct value. The pressure inside the reactor is then adjusted to the final operating pressure. After the equipment has been operating satisfactorily at the desired current levels for 10–20 minutes, the feed of alkali metal fluoride and chlorine to the reactor is commenced. The product gases are condensed in the collection system, where the traps are cooled with liquid nitrogen. At the end of the desired operating period, the feeds of chlorine and alkali metal fluoride are discontinued, and the reactor is evacuated to approximately 5 mm. pressure. The gas collection system is then isolated from the reactor and the product is transferred, by distillation, to a liquid nitrogen-cooled stainless steel cylinder for subsequent analysis. After the reactor has cooled and has been brought back to atmospheric pressure, the solid reaction product is removed from the graphite liner for examination.

The apparatus just described represents but one suitable type of reactor. Various modifications in form and design can be made without affecting the principle and operation of this process, which does not depend on the specific type of equipment used.

The invention is illustrated in greater detail in the example which follows. In this example, the composition of the total gaseous reaction product, without preliminary washing or other purification, was determined by the rapid and accurate method of infrared spectral analysis. This method gives directly, in moles percent, the amount in the reaction product of carbon tetrafluoride, chlorotrifluoromethane and other halomethanes, if any, and of impurities such as silicon tetrafluoride or hydrogen chloride, these latter being present only in small or trace amounts. Unreacted chlorine, if any is present, which does not absorb in the infrared, was determined by difference. Check experiments in which chlorine was determined iodometrically showed that the differential method gave the correct amount of chlorine present within the limits of accuracy of infrared analysis. Similarly, the total amount of chlorine used and the conversions were calculated from the composition of the reaction product as determined by infrared analysis.

*Example*

The apparatus was the rotating carbon arc illustrated in the drawing. The perforated graphite cup inserted in the anode was positioned about 25 mm. from the arc zone and it contained 14.6 g. of 4–8 mesh graphite particles.

This arc reactor was maintained at a pressure of 80 mm. of mercury. The arc was operated by a direct current of 180 amperes at 29 volts and the arc was rotated by a field imposed by a direct current of 100 amperes flowing through the rotator coil. Into the reactor was introduced a gas stream composed of chlorine at the rate of about 105 cc./minute and nitrogen at the rate of about 160 cc./minute, both measured at standard temperature and pressure. Sodium fluoride was simultaneously introduced through the worm injector at the rate of 0.625 g./minute. The gaseous product collected during 30 minutes of operation amounted to 6.76 g. and consisted of the components listed below (the conversions are based on the total chlorine employed and the yields are based on the chlorine actually consumed):

| Component | Weight, g. | Conversion, percent | Yield, percent |
|---|---|---|---|
| $CF_4$ | 6.13 | 93.5 | 94.5 |
| $CF_3Cl$ | 0.40 | 5.5 | 5.2 |
| $Cl_2$ | 0.11 | | |
| $CO_2$ | 0.12 | | |

In this example, the molar ratio of the chlorine to the sodium fluoride fed to the reactor was 0.33:1. The conversion of sodium fluoride to sodium chloride was 65%; in other words, the molar ratio of the sodium reaction product was 65:35 or 1.85:1. The conversion of chlorine to halocarbons was 98.9%, and the halocarbon product contained 94.8 mole percent of carbon tetrafluoride.

The graphite cup, and the graphite particles in it, were found to be clean and free from any sodium halide deposit at the end of this operation. This was confirmation that the reactant carbon was at a temperature above the boiling point of sodium fluoride and sodium chloride throughout the reaction.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A process for preparing carbon tetrafluoride which comprises passing a mixture of chlorine and a fluoride of an alkali metal of atomic number 11 to 19 through an electric carbon arc, the molar ratio of chlorine to alkali metal fluoride in said mixture being from 0.3:1 to 0.5:1, and contacting the effluent products from the carbon arc while in the vaporized phase with a mass of carbon particles additional to that furnished by the carbon arc and which is at a temperature above the boiling point of the alkali metal fluoride and is in amount of at least 0.25 g./atom per mole of the alkali metal fluoride.

2. A process for preparing carbon tetrafluoride which comprises passing a mixture of chlorine and sodium fluoride through an electric carbon arc, the molar ratio of chlorine to sodium fluoride in said mixture being from 0.3:1 to 0.5:1, and contacting the effluent products from the carbon arc while in the vaporized phase with a mass of carbon particles additional to that furnished by the carbon arc and which is at a temperature above the boiling point of sodium fluoride and is in amount of at least 0.25 g./atom per mole of the sodium fluoride.

3. A process for preparing carbon tetrafluoride which comprises passing a mixture of chlorine and a fluoride of an alkali metal of atomic number 11 to 19 through a rotating carbon electric arc, vaporizing said alkali metal fluoride in said rotating carbon electric arc, the molar ratio of chlorine to alkali metal fluoride in said mixture being from 0.3:1 to 0.5:1, and bringing the effluent vaporized mixture from said carbon arc into contact with a mass of carbon particles additional to that furnished by the carbon arc and which is at a temperature above the boiling point of said alkali metal fluoride before said effluent vaporized mixture has cooled below the boiling point of said alkali metal fluoride, said mass of carbon particles being in amount of at least 0.25 g./atom per mole of said alkali metal fluoride.

4. A process for preparing carbon tetrafluoride which comprises passing a mixture of chlorine and sodium fluoride through a rotating carbon electric arc, vaporizing said sodium fluoride in said rotating carbon electric arc, the molar ratio of chlorine to sodium fluoride in said mixture being from 0.3:1 to 0.5:1, and bringing the effluent vaporized mixture from said carbon arc into contact with a mass of carbon particles additional to that furnished by the carbon arc and which is at a temperature above the boiling point of said sodium fluoride before said effluent vaporized mixture has cooled below the boiling point of said sodium fluoride, said mass of carbon particles being in amount of at least 0.25 g./atom per mole of said sodium fluoride.

5. A process for preparing carbon tetrafluoride as set forth in claim 3 wherein said mixture of chlorine and alkali metal fluoride is passed through said rotating carbon electric arc under a pressure within the range of 10 to 300 mm.

6. A process for preparing carbon tetrafluoride as set forth in claim 3 wherein the effluent vaporized mixture from said carbon arc is maintained in intimate contact with said mass of carbon particles heated to a temperature above the boiling point of said alkali metal fluoride until the molar ratio of alkali metal chloride formed to unreacted alkali metal fluoride in the reaction mixture is at least 3:2.

7. A process for preparing carbon tetrafluoride as set forth in claim 3 wherein the effluent vaporized mixture from said carbon arc is maintained in intimate contact with said mass of carbon particles heated to a temperature above the boiling point of said alkali metal fluoride for a period of time within the range of 0.01 second to 2 seconds.

8. A process for preparing carbon tetrafluoride as set forth in claim 3 wherein the effluent vaporized mixture from said carbon arc is brought into contact with said mass of carbon particles within a period not exceeding 0.2 second.

9. A process for preparing carbon tetrafluoride as set forth in claim 3 wherein said mass of carbon particles is at a temperature of at least 1800° C.

References Cited in the file of this patent

UNITED STATES PATENTS 2,709,184     Muetterties     May 24, 1955